US012085248B2

(12) United States Patent
Umemoto

(10) Patent No.: US 12,085,248 B2
(45) Date of Patent: Sep. 10, 2024

(54) VEHICLE LAMP

(71) Applicant: TOYOTA JIDOSHA KABUSHIKI KAISHA, Toyota Aichi-ken (JP)

(72) Inventor: Akira Umemoto, Nagoya Aichi-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 0 days.

(21) Appl. No.: 18/208,497

(22) Filed: Jun. 12, 2023

(65) Prior Publication Data

US 2024/0052987 A1 Feb. 15, 2024

(30) Foreign Application Priority Data

Aug. 12, 2022 (JP) ................................ 2022-128886

(51) Int. Cl.
*F21S 41/275* (2018.01)

(52) U.S. Cl.
CPC .................................. *F21S 41/275* (2018.01)

(58) Field of Classification Search
CPC .......... F21S 41/275; F21S 41/29; F21S 45/33; B60Q 1/04; F21V 31/00
See application file for complete search history.

(56) References Cited

U.S. PATENT DOCUMENTS 6,179,456 B1 * 1/2001 Nakamura ............ F21S 41/275 362/293
6,435,702 B1 * 8/2002 Aikawa ................... F21S 45/10 362/267
6,454,449 B2 * 9/2002 Nestell .................... F21S 41/28 362/267

FOREIGN PATENT DOCUMENTS

JP 2011-084172 A 4/2011

* cited by examiner

*Primary Examiner* — Peggy A Neils
(74) *Attorney, Agent, or Firm* — Dinsmore & Shohl LLP

(57) ABSTRACT

A vehicle lamp includes a housing attached to a vehicle and including an opening, an outer lens covering the opening of the housing and including an inner surface subjected to an anti-fogging treatment, and a light source disposed in an internal space defined by the housing and the outer lens. The inner surface of the outer lens includes a first region and a second region adjacent to the first region and positioned below the first region. The inner surface of the outer lens is provided with a protrusion, a step, or a groove along a boundary between the first region and the second region.

8 Claims, 5 Drawing Sheets

VEHICLE LAMP

CROSS-REFERENCE TO RELATED APPLICATION

This application claims priority to Japanese Patent Application No. 2022-128886 filed on Aug. 12, 2022 incorporated herein by reference in its entirety.

BACKGROUND

1. Technical Field

The technique disclosed in the present specification relates to a vehicle lamp (e.g., a head lamp, a rear combination lamp, etc.).

2. Description of Related Art

Japanese Unexamined Patent Application Publication No. 2011-084172 (JP 2011-084172 A) describes a vehicle with a head lamp. This head lamp includes a housing and an outer lens. An engine hood is disposed above the head lamp.

SUMMARY

Generally, in the head lamp as described above, an anti-fogging coating film is provided on the inner surface of the outer lens. Due to this anti-fogging coating film, water vapor in the head lamp does not condense as water droplets, and forms a water film along the anti-fogging coating film. This can restrain the outer lens from fogging up. However, when the water film exceeding a certain amount is generated, there is a possibility that a dripping trace of the water film is generated, due to the water film spread on the inner surface of the outer lens being dried. Such deterioration in appearance due to these dripping traces of the water film may occur not only in head lamps but also lamps in general subjected to an anti-fogging treatment.

In view of the above actual circumstances, the present specification provides a technique for avoiding or suppressing deterioration in the appearance of the vehicle lamp subjected to the anti-fogging treatment.

The technique disclosed in the present specification is embodied as a vehicle lamp. In a first aspect, a vehicle lamp includes a housing attached to a vehicle and including an opening, an outer lens covering the opening of the housing and including an inner surface subjected to an anti-fogging treatment, and a light source disposed in an internal space defined by the housing and the outer lens. The inner surface of the outer lens includes a first region and a second region adjacent to the first region and positioned below the first region. The inner surface of the outer lens is provided with a protrusion, a step, or a groove along a boundary between the first region and the second region.

In the vehicle lamp described above, the inner surface of the outer lens is subjected to the anti-fogging treatment. Therefore, fogging of the outer lens can be restrained. Furthermore, the outer lens includes the first region and the second region positioned below the first region, and the protrusion, the step, or the groove (hereinafter may be referred to as the protrusion or the like) is provided along the boundary between these regions. According to such a configuration, even in a case where a water film exceeding a certain amount is generated on the outer lens, it is possible to avoid or suppress the movement of the water film from the first region to the second region by the protrusion or the like. As a result, it is possible to avoid or suppress deterioration in appearance due to a dripping trace of the water film.

In a second aspect, when the vehicle to which the vehicle lamp is attached is placed under sunshine in the first aspect, an amount of temperature rise in the first region may be smaller than an amount of temperature rise in the second region. When the vehicle to which the vehicle lamp is attached is placed under the sunshine, the temperature difference becomes relatively large between the temperature of the air in the internal space defined by the housing and the outer lens and the temperature of the portion of the outer lens in which the amount of temperature rise is small. After that, when those temperatures drop, the water film is likely to be formed in the region in which the amount of temperature rise is small in the outer lens subjected to the anti-fogging treatment. Therefore, in the configuration described above, the water film is more likely to be generated in the first region than in the second region. Regarding this point, since the protrusion or the like is provided along the boundary between the first region and the second region, it is possible to avoid or suppress the movement of the water film from the first region to the second region.

In a third aspect, when the vehicle lamp is attached to the vehicle in the first or the second aspect, the first region may include a region covered from above by a component of the vehicle, and the second region need not include a region covered from above by the component. In this case, the amount of temperature rise under the sunshine becomes smaller in the region covered from above by the component of the vehicle than the region not covered from above by the component of the vehicle. Therefore, also in the configuration described above, the water film is more likely to be generated in the first region than in the second region. Regarding this point, since the protrusion or the like is provided along the boundary between the first region and the second region, it is possible to avoid or suppress the movement of the water film from the first region to the second region.

In a fourth aspect, the protrusion, the step, or the groove in the third aspect may be positioned on the first region side with respect to the boundary between the first region and the second region. According to such a configuration, when the vehicle lamp is attached to the vehicle, the protrusion or the like provided on the inner surface of the outer lens can be covered from above by the component of the vehicle. Therefore, it is possible to avoid deterioration in appearance when the vehicle lamp is attached to the vehicle.

In a fifth aspect, the vehicle lamp in any one of the first aspect to the fourth aspect may further include an inner lens unit disposed in the internal space. In this case, the inner lens unit may include a third region facing the first region of the outer lens and a fourth region facing the second region of the outer lens. A heat absorption rate of the third region may be smaller than a heat absorption rate of the fourth region. According to such a configuration, the amount of temperature rise in the first region becomes smaller than that in the second region. Therefore, the water film is more likely to be generated in the first region than in the second region. Regarding this point, since the protrusion or the like is provided along the boundary between the first region and the second region, it is possible to avoid or suppress the movement of the water film from the first region to the second region.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A vehicle 100 on which a head lamp 10 of the first embodiment is mounted will be described with reference to the drawings. The vehicle 100 is a so-called automobile and a vehicle that runs on a road surface. The vehicle 100 is, for example, an engine vehicle, a hybrid electric vehicle, a fuel cell electric vehicle, a battery electric vehicle, a solar car, or the like. Part or all of the technique described in the present embodiment can be similarly applied to a vehicle that runs on a track. Further, the vehicle is not limited to a vehicle operated by a user, and may be a vehicle remotely operated by an external device or may be a vehicle that performs autonomous driving.

Figure 1:
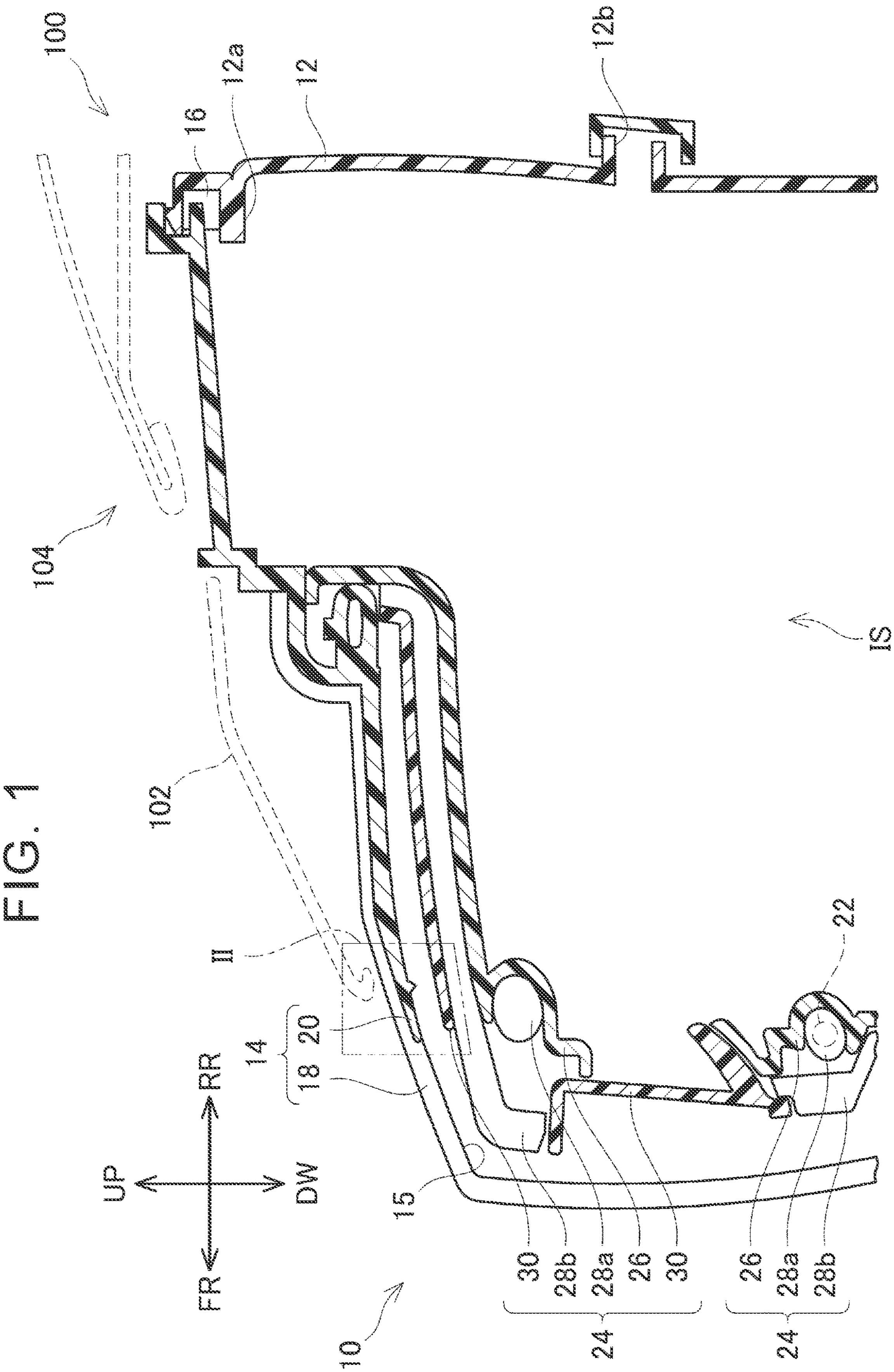
FIG. 1 is a diagram schematically showing a configuration of a head lamp 10 of a first embodiment, in which a design panel 102 and a vehicle body 104 of a vehicle 100 are indicated by broken lines.

As shown in FIG. 1, the vehicle 100 includes a design panel 102. The design panel 102 is a member for improving the design property of the front portion of the vehicle 100 and is disposed on the head lamp 10. Therefore, part of the head lamp 10 is covered from above by the design panel 102, and the remainder of the head lamp 10 is not covered from above by the design panel 102. Note that the design panel 102 may be attached to a vehicle body 104 or may be attached to the head lamp 10. The design panel 102 in the present embodiment is an example of components of the vehicle 100 in the present technique. In other embodiments, the component of the vehicle 100 may be a hood, a fender, a front bumper, or the like provided at the front portion of the vehicle body 104.

Here, each direction of the head lamp 10 in the drawings corresponds to the direction when the head lamp 10 is mounted on the vehicle 100, that is, the direction of the vehicle 100. Therefore, a direction FR indicates the front in a front-rear direction of the vehicle 100, and a direction RR indicates the rear in the front-rear direction of the vehicle 100. Further, a direction LH indicates the left in a right-left direction of the vehicle 100, and a direction RH indicates the right in the right-left direction of the vehicle 100. In addition, a direction UP indicates upward in a vertical direction of the vehicle 100, and a direction DW indicates downward in the vertical direction of the vehicle 100.

As shown in FIG. 1, the head lamps 10 are attached to both right and left sides of the front portion of the vehicle 100 and emit light forward of the vehicle 100. The head lamps 10 are provided symmetrically with respect to the right-left direction of the vehicle 100. Although the head lamp 10 provided on the left side of the vehicle 100 will be mainly described below, the description also applies to the head lamp provided on the right side of the vehicle 100. Moreover, the technique described in the present embodiment is not limited to the head lamp 10, and can be applied to a vehicle lamp such as a rear combination lamp. Here, the rear combination lamp is a vehicle lamp in which lamps such as a tail lamp, a brake lamp, and a turn signal lamp are integrated and that is attached to both right and left sides of the rear portion of the vehicle 100.

As shown in FIG. 1, the head lamp 10 includes a housing 12 and an outer lens 14. The housing 12 is a housing member that houses a component of the head lamp 10 such as a light source 22. The housing 12 has an opening 12*a* provided in the front portion of the housing 12. The outer lens 14 is provided in front of the housing 12 and covers the opening 12*a* of the housing 12. Therefore, an internal space IS is defined by the housing 12 and the outer lens 14. As an example, the housing 12 and the outer lens 14 are connected by an adhesive 16. Although not particularly limited, a breathing hole 12*b* is provided in the rear portion of the housing 12, and the internal space IS communicates with the outside through the breathing hole 12*b*.

As shown in FIG. 1, the outer lens 14 includes a transparent lens 18 and a design lens 20. The transparent lens 18 is a transparent lens that transmits light that has passed through inner lenses 28*a* and 28*b*. The design lens 20 is a non-transparent lens that improves the design property of the head lamp 10. As an example, the design lens 20 in the present embodiment is colored black. The transparent lens 18 is disposed from the front portion to the upper portion of the head lamp 10, and the design lens 20 is disposed in the upper portion of the head lamp 10. As a result, the portion covered by the design lens 20 is not visible from the outside of the head lamp 10, and the design property of the head lamp 10 can be improved.

An inner surface 15 of the outer lens 14 is subjected to an anti-fogging treatment. Although not particularly limited, in the present embodiment, an anti-fogging coating film is formed in the inner surface 15 of the outer lens 14. Therefore, the anti-fogging coating film is formed on the inner surface of each of the transparent lens 18 and the design lens 20. This anti-fogging coating film is formed by applying an anti-fogging paint containing a surfactant. Water vapor in the head lamp 10 does not condense as water droplets, and forms a water film along the anti-fogging coating film. Therefore, the outer lens 14 can be restrained from fogging up.

As shown in FIG. 1, the head lamp 10 further includes the light source 22. The light source 22 is a light emitter that emits visible light. The light source 22 is, for example, a light emitting diode (LED). In the internal space IS defined by the housing 12 and the outer lens 14, the light source 22 is disposed in the inner lens 28*a*. The light source 22 is configured to be controllable by a control device (not shown), and light emission is controlled by a command from the control device. The light source 22 in the present embodiment constitutes a daytime running lamp (DRL), and is disposed on the front side when viewed on the paper of FIG. 1. Alternatively or additionally, the light source 22 may constitute a turn signal lamp.

As shown in FIG. 1, the head lamp 10 includes an inner lens unit 24. The inner lens unit 24 is disposed in the internal space IS formed by the housing 12 and the outer lens 14 and supported by the housing 12. The inner lens unit 24 includes a reflector 26, the inner lenses 28*a* and 28*b*, and an extension 30. The reflector 26 is a reflecting member that reflects the light from the light source 22, and the front surface of the reflector 26 is subjected to vapor deposition such as aluminum vapor deposition. The reflector 26 is disposed behind the light source 22. The inner lenses 28*a* and 28*b* are transparent lenses that allow the light from the light source 22 to pass therethrough. The inner lenses 28*a* and 28*b* include a first inner lens 28*a* and a second inner lens 28*b*. The first inner lens 28*a* defines the shape of the DRL and is provided in an annular shape. Part of the second inner lens 28*b* is disposed in front of the first inner lens 28*a*. The extension 30 is a non-transparent resin that blocks the light from the light source 22. The extension 30 is disposed around the inner lenses 28*a* and 28*b*, and improves the design property of the head lamp 10 by blocking the light from the inner lenses 28*a* and 28*b*. The specific shape and number of the reflector 26, the inner lenses 28*a* and 28*b*, and the extension 30 included in the inner lens unit 24 are not limited, and can be changed as appropriate according to the design of the head lamp 10.

Figure 2:
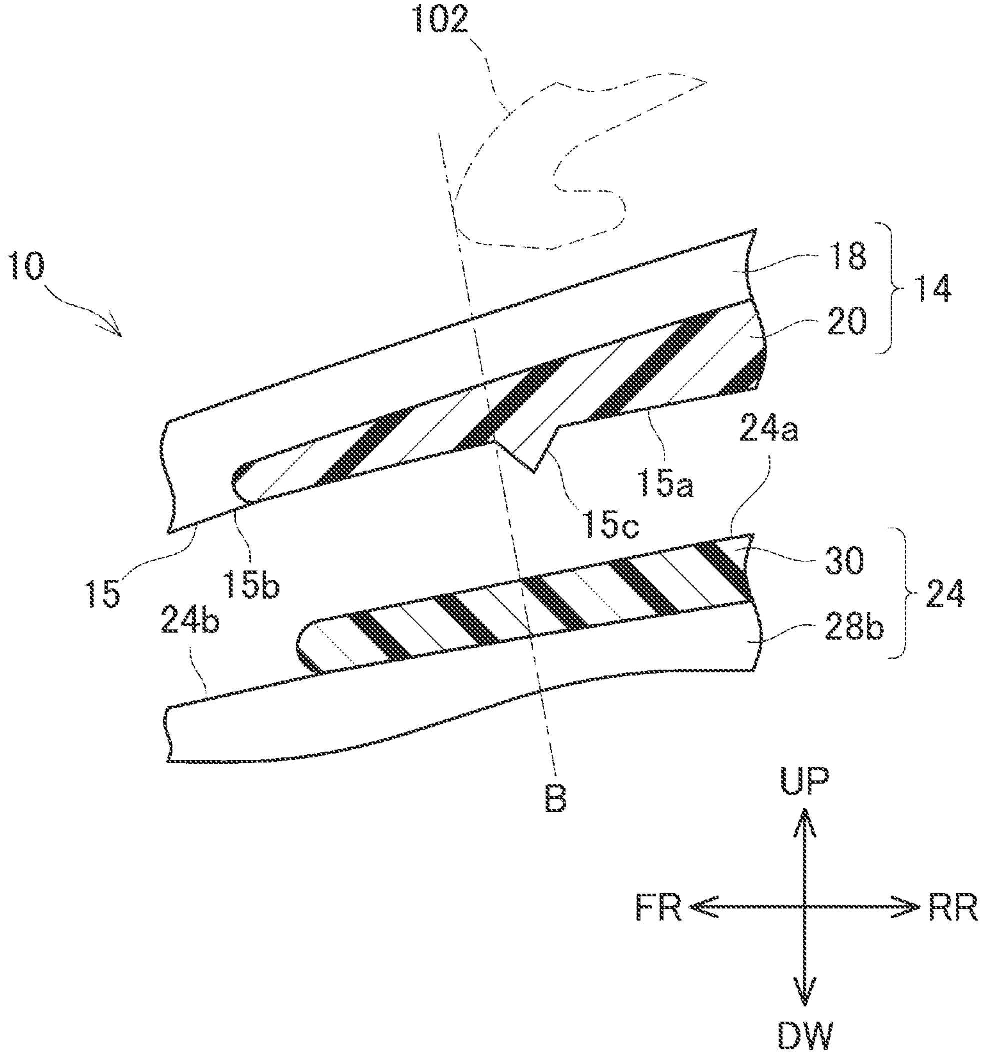
FIG. 2 is an enlarged view of part II in FIG. 1.

As shown in FIGS. 1 and 2, the inner surface 15 of the outer lens 14 includes a first region 15*a* and a second region 15*b*. The first region 15*a* and the second region 15*b* are adjacent to each other, and the second region 15*b* is positioned below the first region 15*a*. As described above, the design panel 102 is disposed on the head lamp 10, and part of the outer lens 14 is covered from above by the design panel 102. Thereby, the inner surface 15 of the outer lens 14 is divided into a region covered from above by the design panel 102 and a region not covered from above by the design panel 102. The former region is the above-described first region 15*a*, and the latter region is the above-described second region 15*b*. When the vehicle 100 is placed under the sunshine, the design panel 102 blocks the sunlight in the first region 15*a* and the portion of the inner lens unit 24 that faces the first region 15*a*. Therefore, the amount of temperature rise becomes relatively small. On the other hand, the second region 15*b* and the portion of the inner lens unit 24 facing the second region 15*b* are irradiated with sunlight. Therefore, the amount of temperature rise becomes relatively large. Thus, the amount of temperature rise differs between the first region 15*a* and the second region 15*b* when the vehicle 100 is placed under the sunshine.

As shown in FIGS. 1 and 2, the inner surface 15 of the outer lens 14 further includes a protrusion 15*c*. The protrusion 15*c* is provided along a boundary B between the first region 15*a* and the second region 15*b*. As described above, since the first region 15*a* and the second region 15*b* are vertically adjacent to each other, the boundary B between them extends substantially horizontally, and the protrusion 15*c* also continuously extends substantially horizontally. The protrusion 15*c* protrudes downward from the first region 15*a* and the second region 15*b*. Note that the protrusion 15*c* does not necessarily have to be positioned on the boundary B, and may be offset with respect to the boundary B.

In the head lamp 10 described above, the inner surface 15 of the outer lens 14 is subjected to the anti-fogging treatment. Therefore, fogging of the outer lens 14 can be restrained. For example, when the vehicle 100 to which the head lamp 10 is attached is placed under the sunshine, the temperature of the outer lens 14 and the temperature of the air in the internal space IS defined by the housing 12 and the outer lens 14 rise. In addition, as those temperatures rise, moisture is released from the polymer material constituting the inner lens unit 24, for example, and the amount of water vapor in the internal space IS increases. After that, when those temperatures drop, condensation may occur on the inner surface 15 of the outer lens 14. However, the anti-fogging treatment applied to the inner surface 15 restrains the condensation as water droplets and allows a thin water film to be formed along the inner surface 15.

However, the inner surface 15 of the outer lens 14 has the first region 15*a* having a relatively small amount of temperature rise in the duration of sunshine and the second region 15*b* having a relatively large amount of temperature rise in the duration of sunshine. Therefore, the water film tends to grow thicker in the first region 15*a* than in the second region 15*b*. Since the second region 15*b* is present below the first region 15*a*, there is a possibility that the water film generated in the first region 15*a* spreads to the second region 15*b*. In this case, there is a possibility that a dripping trace of the water film is generated in the second region 15*b*, and the appearance of the head lamp 10 is deteriorated. Regarding this point, in the present embodiment, the protrusion 15*c* is provided along the boundary B between the first region 15*a* and the second region 15*b*. According to such a configuration, even in a case where the water film grows thick in the first region 15*a*, the protrusion 15*c* can avoid or suppress the movement of the water film from the first region 15*a* to the second region 15*b*. As a result, it is possible to avoid or suppress deterioration in appearance due to the dripping trace of the water film.

Figure 3:
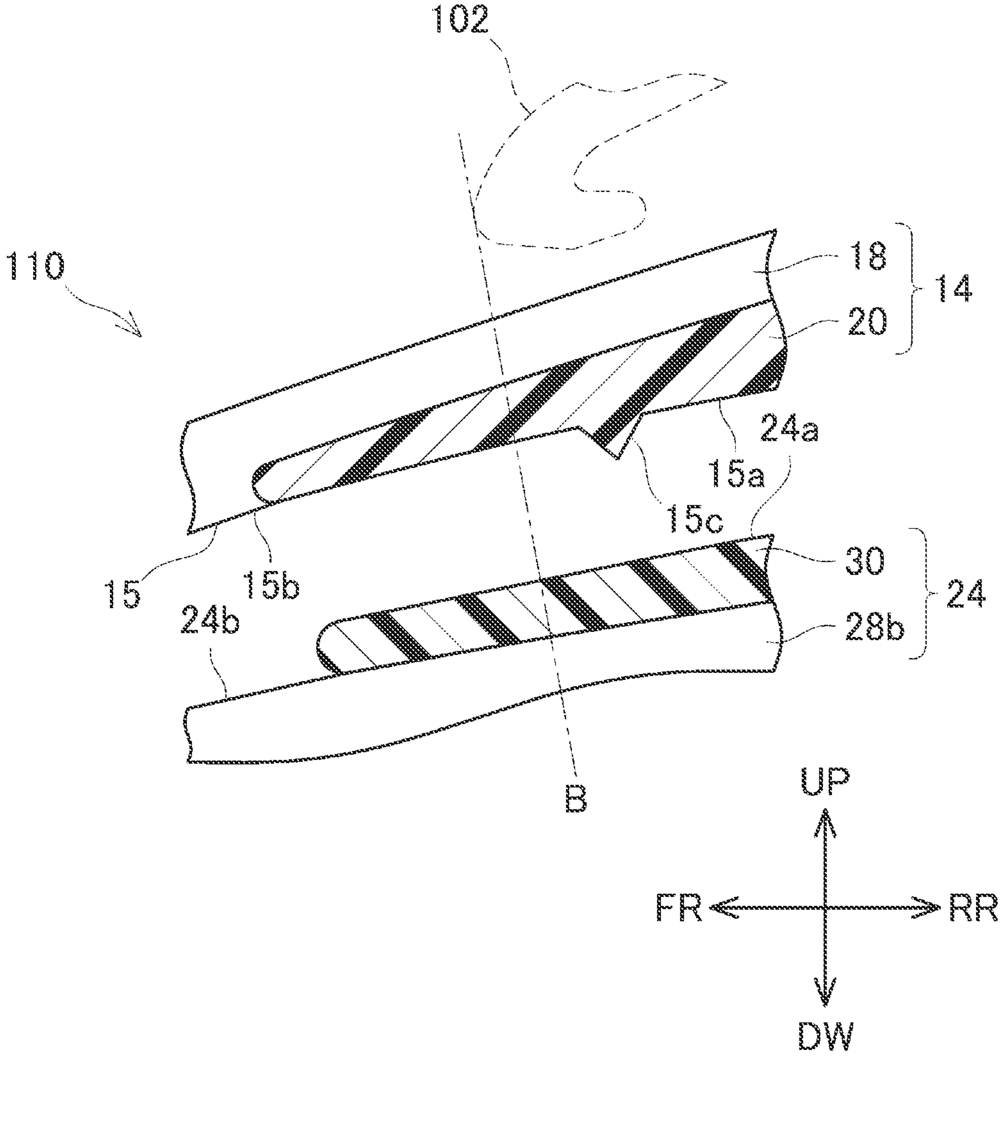
FIG. 3 is an enlarged view corresponding to FIG. 2, showing a head lamp 110 of a modification.

Although it is an example, the position of the protrusion 15*c* provided on the inner surface 15 of the outer lens 14 can be changed as appropriate. For example, as shown in FIG. 3, in a head lamp 110 of a modification, the protrusion 15*c* is positioned on the first region 15*a* side with respect to the boundary B between the first region 15*a* and the second region 15*b*. With such a configuration, the protrusion 15*c* provided on the inner surface 15 of the outer lens 14 is covered from above by the design panel 102. Therefore, deterioration in the appearance of the head lamp 110 can be avoided. However, as another embodiment, the protrusion 15*c* may be positioned on the second region 15*b* side with respect to the boundary B. That is, the protrusion 15*c* may be positioned on either side of the boundary B, and may be provided along the boundary B within a range of 30 mm on both sides of the boundary B, for example.

As an example, as shown in FIG. 2, the inner lens unit 24 includes a third region 24*a* facing the first region 15*a* of the outer lens 14 and a fourth region 24*b* facing the second region 15*b* of the outer lens 14. For example, in a case where the heat absorption rate of the third region 24*a* is lower than the heat absorption rate of the fourth region 24*b*, the amount of temperature rise in the first region 15*a* in the duration of sunshine becomes smaller than the amount of temperature rise in the second region 15*b* in the duration of sunshine even without the design panel 102. As a result, the water film tends to grow thicker in the first region 15*a* than in the second region 15*b*. However, as described above, the protrusion 15*c* avoids or suppresses the water film from spreading to the second region 15*b*. Thus, the technique described in the present embodiment can be widely applied to various configurations in which the inner surface 15 of the outer lens 14 experiences a non-uniform temperature rise. Each of the third region 24*a* and the fourth region 24*b* of the inner lens unit 24 may be provided in any one of the reflector 26, the inner lenses 28*a* and 28*b*, and the extension 30.

Second Embodiment

Next, a head lamp 120 of the second embodiment will be described with reference to FIG. 4. Compared with the head lamp 10 of the first embodiment, the head lamp 120 of the present embodiment is provided with a step 15*d* instead of the protrusion 15*c* on the inner surface 15 of the outer lens 14. Other configurations are common between the first embodiment and the present embodiment. By giving the same reference signs to the common configurations, overlapping descriptions are omitted here.

Figure 4:
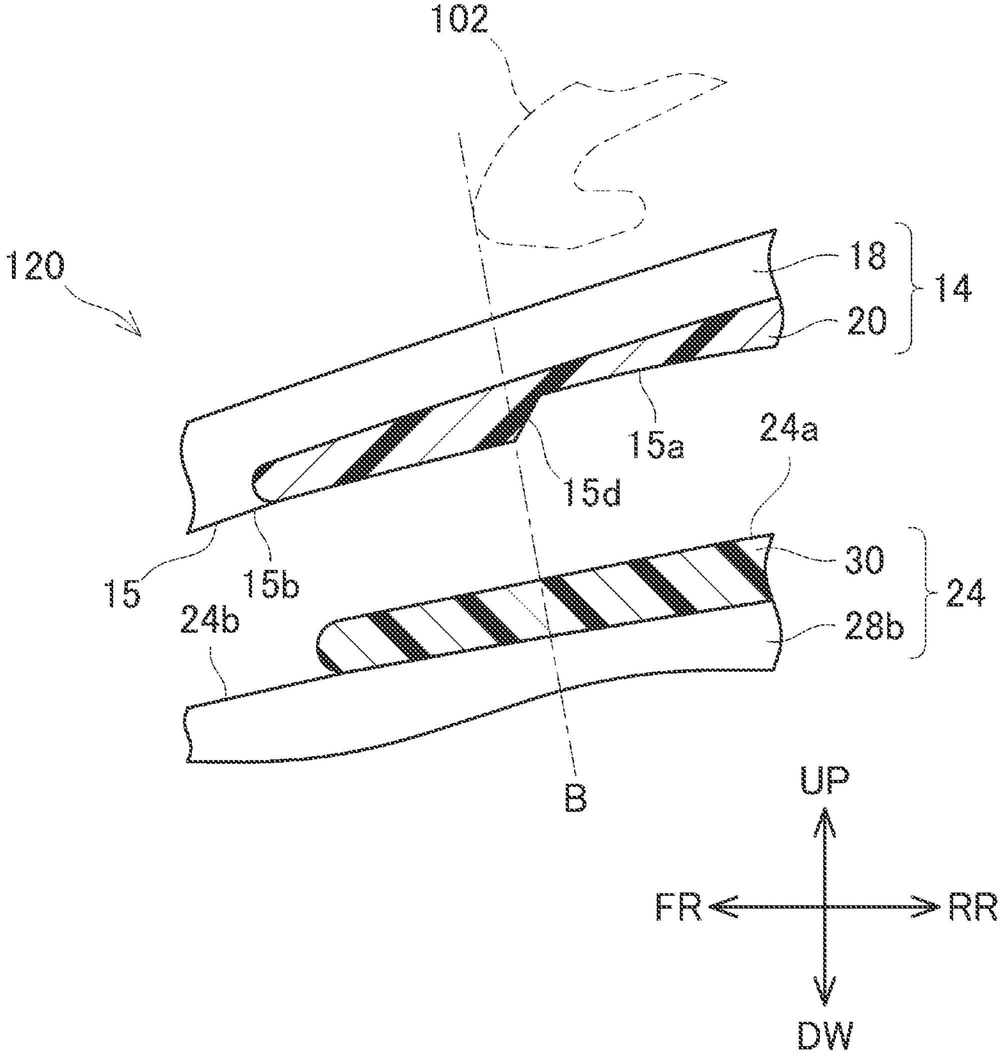
FIG. 4 is an enlarged view corresponding to FIG. 2, showing a head lamp 120 of a second embodiment.

As shown in FIG. 4, the step 15*d* is provided along the boundary B between the first region 15*a* and the second region 15*b*. As described above, since the first region 15*a* and the second region 15*b* are vertically adjacent to each other, the boundary B between them extends substantially horizontally, and the protrusion 15*c* also continuously extends substantially horizontally. The step 15*d* extends forward and downward from the first region 15*a* toward the second region 15*b* positioned below the first region 15*a*. The step 15*d* is locally inclined compared to the first region 15*a* and the second region 15*b*. Also according to such a configuration, in a case where the water film grows thick in the first region 15*a*, the step 15*d* can avoid or suppress the movement of the water film from the first region 15*a* to the second region 15*b*.

Third Embodiment

Next, a head lamp 130 of the third embodiment will be described with reference to FIG. 5. Compared with the head lamp 10 of the first embodiment, the head lamp 130 of the present embodiment is provided with a groove 15*e* instead of the protrusion 15*c* on the inner surface 15 of the outer lens 14. Other configurations are common between the first embodiment and the present embodiment. By giving the same reference signs to the common configurations, overlapping descriptions are omitted here.

Figure 5:
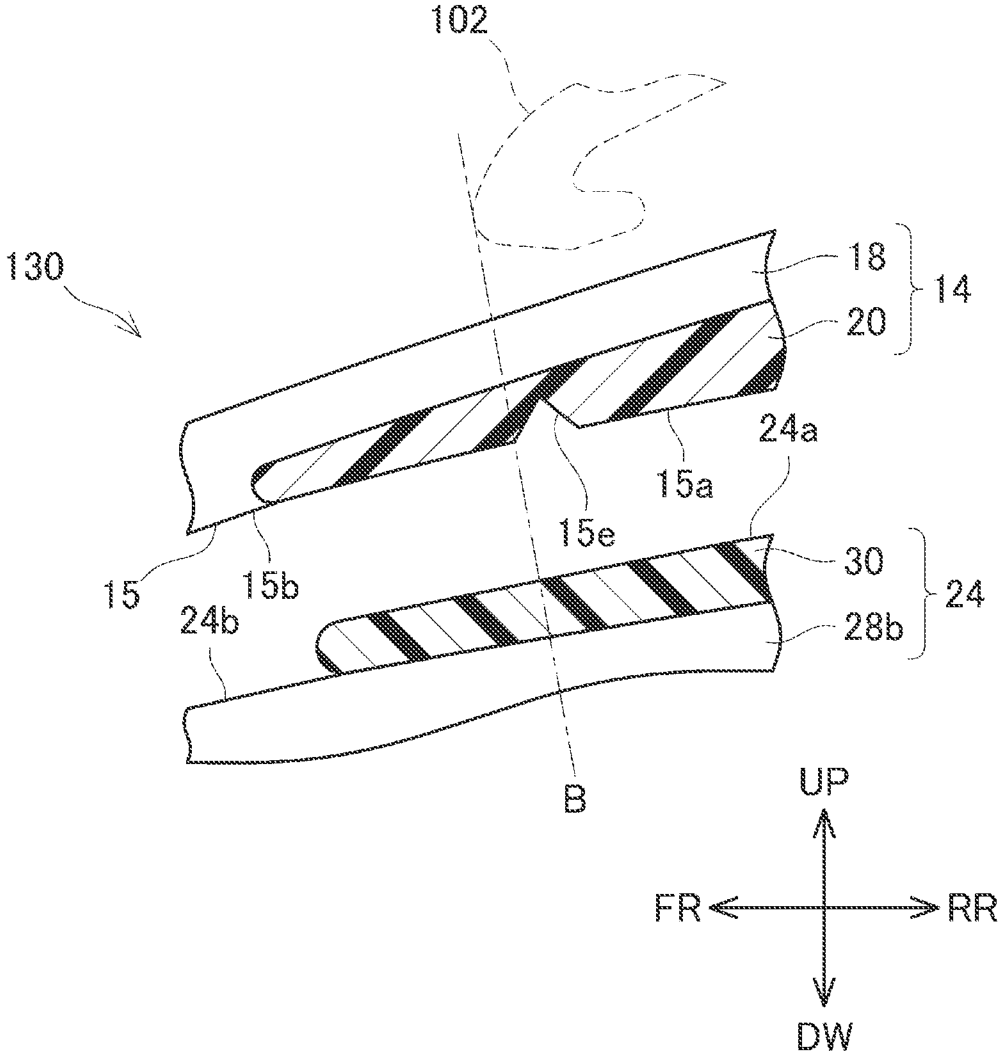
FIG. 5 is an enlarged view corresponding to FIG. 2, showing a head lamp 130 of a third embodiment.

As shown in FIG. 5, the groove 15*e* is provided along the boundary B between the first region 15*a* and the second region 15*b*. As described above, since the first region 15*a* and the second region 15*b* are vertically adjacent to each other, the boundary B between them extends substantially horizontally, and the groove 15*e* also continuously extends substantially horizontally. The groove 15*e* is recessed upward from the first region 15*a* and the second region 15*b*. Also according to such a configuration, in a case where the water film grows thick in the first region 15*a*, the groove 15*e* can avoid or suppress the movement of the water film from the first region 15*a* to the second region 15*b*.

Although a number of specific examples have been described in detail above, these are merely examples and do not limit the scope of claims. The techniques described in the claims include various modifications and alterations of the specific examples illustrated above. The technical elements described in the present specification or drawings exhibit technical utility either on its own or in combination.

What is claimed is:

1. A vehicle lamp comprising:

a housing attached to a vehicle and including an opening;

an outer lens covering the opening of the housing, the outer lens includes a transparent outer lens and a non-transparent outer lens, an inner surface of the transparent outer lens is positioned below an inner surface of the non-transparent outer lens, the inner surface of the transparent outer lens and the inner surface of the non-transparent outer lens are subjected to an anti-fogging treatment; and a light source disposed in an internal space defined by the housing and the outer lens, wherein the inner surface of the non-transparent outer lens includes a first region and a second region adjacent to the first region and positioned below the first region, and the inner surface of the non-transparent outer lens is provided with a protrusion, a step, or a groove along a boundary between the first region and the second region.

2. The vehicle lamp according to claim 1, wherein when the vehicle to which the vehicle lamp is attached is placed under sunshine, an amount of temperature rise in the first region is smaller than an amount of temperature rise in the second region.

3. The vehicle lamp according to claim 1, wherein when the vehicle lamp is attached to the vehicle, the first region includes a region covered from above by a component of the vehicle, and the second region does not include a region covered from above by the component.

4. The vehicle lamp according to claim 3, wherein the protrusion, the step, or the groove is positioned on the first region side with respect to the boundary between the first region and the second region.

5. The vehicle lamp according claim 1, further comprising an inner lens unit disposed in the internal space, wherein:

the inner lens unit includes a third region facing the first region of the outer lens and a fourth region facing the second region of the outer lens; and a heat absorption rate of the third region is smaller than a heat absorption rate of the fourth region.

6. A vehicle lamp mounted on a vehicle comprising a panel, the vehicle lamp comprising:

a housing attached to a vehicle and including an opening;

an outer lens covering the opening of the housing and including an inner surface subjected to an anti-fogging treatment; and a light source disposed in an internal space defined by the housing and the outer lens, wherein the inner surface of the outer lens includes a first region and a second region adjacent to the first region and positioned below the first region, the first region being a region covered from above by the panel and the second region being a region not covered from above by the panel, and the first region is provided with a protrusion, a step, or a groove along a boundary between the first region and the second region.

7. The vehicle lamp according to claim 6, wherein when the vehicle to which the vehicle lamp is attached is placed under sunshine, an amount of temperature rise in the first region is smaller than an amount of temperature rise in the second region.

8. The vehicle lamp according claim 6, further comprising an inner lens unit disposed in the internal space, wherein:

the inner lens unit includes a third region facing the first region of the outer lens and a fourth region facing the second region of the outer lens; and a heat absorption rate of the third region is smaller than a heat absorption rate of the fourth region.

* * * * *